(No Model.)
J. W. VAUGHN.
SULKY AXLE.
No. 489,578. Patented Jan. 10, 1893.
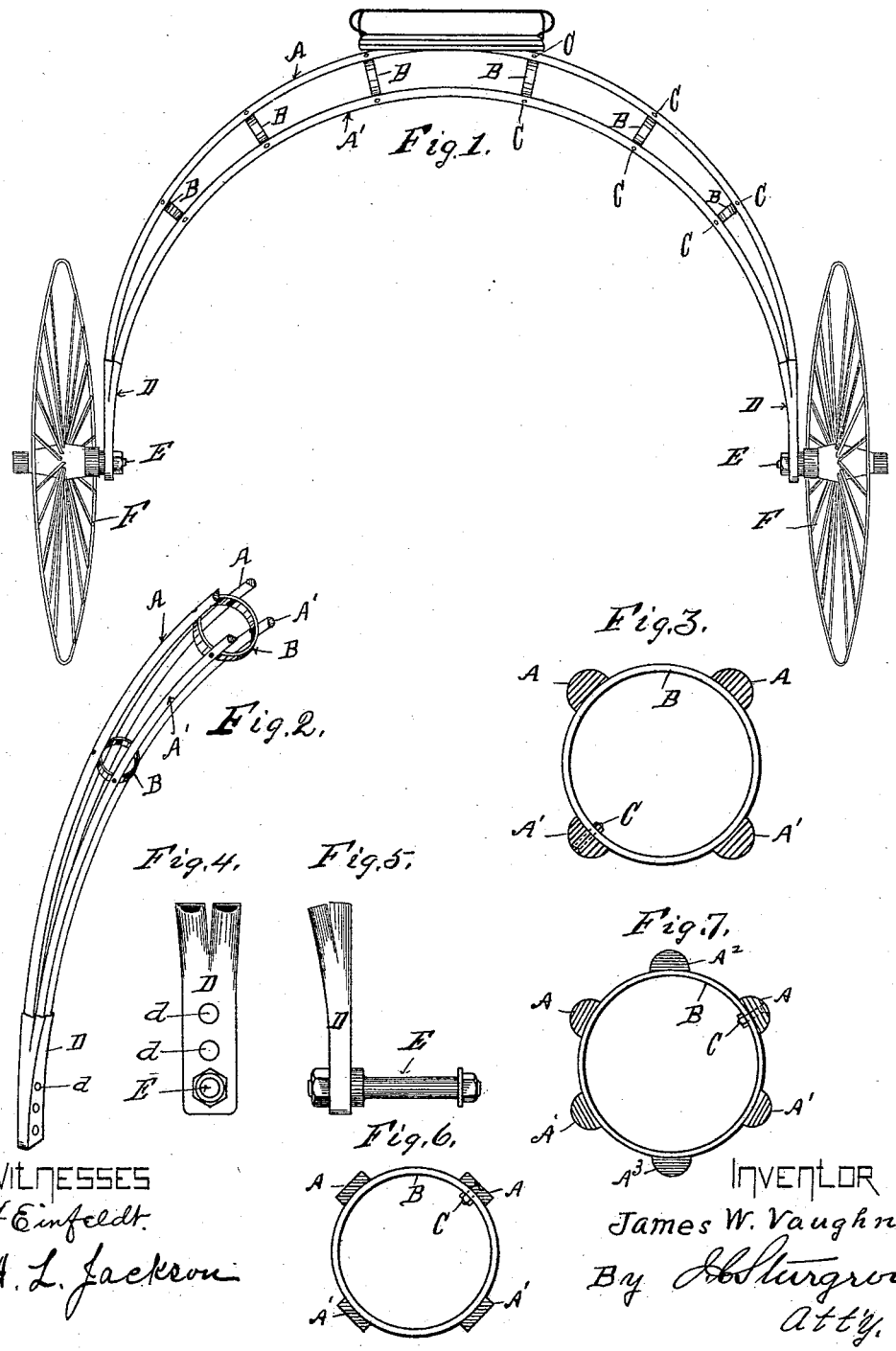

UNITED STATES PATENT OFFICE.

JAMES W. VAUGHN, OF GREENVILLE, PENNSYLVANIA.

SULKY-AXLE.

SPECIFICATION forming part of Letters Patent No. 489,578, dated January 10, 1893.

Application filed October 29, 1892. Serial No. 450,397. (No model.)

*To all whom it may concern:*

Be it known that I, JAMES W. VAUGHN, a citizen of the United States, residing at Greenville, in the county of Mercer and State of Pennsylvania, have invented certain new and useful Improvements in Sulky-Axles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in sulky axles hereinafter set forth and explained and illustrated in the accompanying drawings in which, Figure 1. is a rear view in elevation of my improved sulky axle with the wheels thereon. Fig. 2. is a perspective view of a section of my improved sulky axle. Fig. 3. is a cross section of the same. Fig. 4. is a side elevation of one of the end sections of my improved sulky axle. Fig. 5. is a rear elevation of the same, showing the removable wheel spindle in place therein. Fig. 6. shows a cross section of my improved sulky axle, made of strips of metal. Fig. 7. shows a like section of a modified construction of my improved sulky axles.

The objects of my invention are: To construct a trussed sulky axle, of four or more longitudinal strips or sections, bent so as to form an arch and centrally secured together, by means of circular braces, so that a cross section of the arch is tubular, whereby the maximum lightness, strength and rigidity is secured. I accomplish these results by constructing my improved axle of four or more arched sections A, A, A' A' braced together centrally, preferably by means of metal rings B, to which the sections A A and A' A' are secured by means of small bolts C, so as to form a tubular arch: these rings or braces B, being preferably gradually reduced in size from the central portion toward the ends of the axle, so that the axle tapers gradually from the center toward the ends thereof, where the sections A, A, and A', A', are brought nearly together and secured into metal projections D, D, adapted to receive and support removable and adjustable wheel spindles E, E, upon which the wheels F, F, are mounted.

In Fig. 6. I show my axle embodying the features hereinbefore described when made of strips of metal in lieu of wood, and in Fig. 7. I show a section of one of my axles made of six sections in lieu of four as hereinbefore described, it being understood that I can construct my tubular arched axle, of four or more sections as may be found desirable.

Having thus fully described my invention so as to enable others to construct and use the same, what I claim as new and desire to secure by Letters-Patent of the United States is:

1. The combination in a sulky axle, of four or more arched sections, with braces securing said arched sections together so as to form substantially a tubular arch, substantially as and for the purpose set forth.

2. The combination in a sulky axle, of four or more arched sections, with braces gradually decreasing from the center toward the ends of the axle securing said arched sections together, so as to form substantially a tubular arch, and end sections securing the ends of the arched sections of the axle together, substantially as and for the purpose set forth.

3. The combination in a sulky axle, of four or more arched sections, and braces securing said arched sections so as to form substantially a tubular arch, with end sections securing the ends of the arched sections together, and removable wheel spindles, secured in said end sections, substantially as and for the purpose set forth.

In testimony whereof I affix my signature in presence of two witnesses.

JAMES W. VAUGHN.

Witnesses:
C. BITTENBANNER,
A. C. SMITH.